United States Patent [19]

Hall et al.

[11] 4,006,215
[45] Feb. 1, 1977

[54] RECOVERING IRON, NICKEL, OR COBALT FROM SULFATE SOLUTION

[75] Inventors: Rotrou Alan Hall, Mississauga; William Edward Jones, Burlington; Kohur Nagaraja Subramanian, Mississauga, all of Canada

[73] Assignee: The International Nickel Company, Inc., New York, N.Y.

[22] Filed: Sept. 26, 1975

[21] Appl. No.: 616,926

[30] Foreign Application Priority Data

Apr. 2, 1975 Canada .................. 223652

[52] U.S. Cl. .................. 423/142; 423/150; 423/160; 423/161; 423/164; 423/166

[51] Int. Cl.² .................. C01G 49/02; C01G 51/04; C01G 53/04; C01F 11/00

[58] Field of Search .......... 423/140, 142, 146, 147, 423/160, 161, 166, 554, 164, 636, 150

[56] References Cited

UNITED STATES PATENTS

| | | | |
|---|---|---|---|
| 1,112,770 | 10/1914 | Clarke | 423/554 |
| 2,433,458 | 12/1947 | Kahn et al. | 423/147 |
| 3,044,868 | 7/1962 | Francis | 423/142 |
| 3,375,066 | 3/1968 | Murakami et al. | 423/166 |
| 3,720,749 | 3/1973 | Taylor et al. | 423/141 |

*Primary Examiner*—Oscar R. Vertiz
*Assistant Examiner*—Brian E. Hearn
*Attorney, Agent, or Firm*—Lewis Messulam; Ewan E. MacQueen

[57] ABSTRACT

Sulfate solutions containing at least one valuable metal from the group: Fe, Ni and Co, particularly solutions resulting from the leaching of lateritic ores or concentrates, are treated to recover the valuable metal. The latter is precipitated by treating the solution with magnesium hydroxide. The resulting magnesium-containing solution is treated with lime under controlled conditions to precipitate relatively fine particles of magnesium hydroxide and relatively coarse particles of gypsum. The difference in particle size is relied on to separate the magnesium hydroxide (for recycling) from the gypsum (which is calcined to regenerate lime).

6 Claims, 1 Drawing Figure

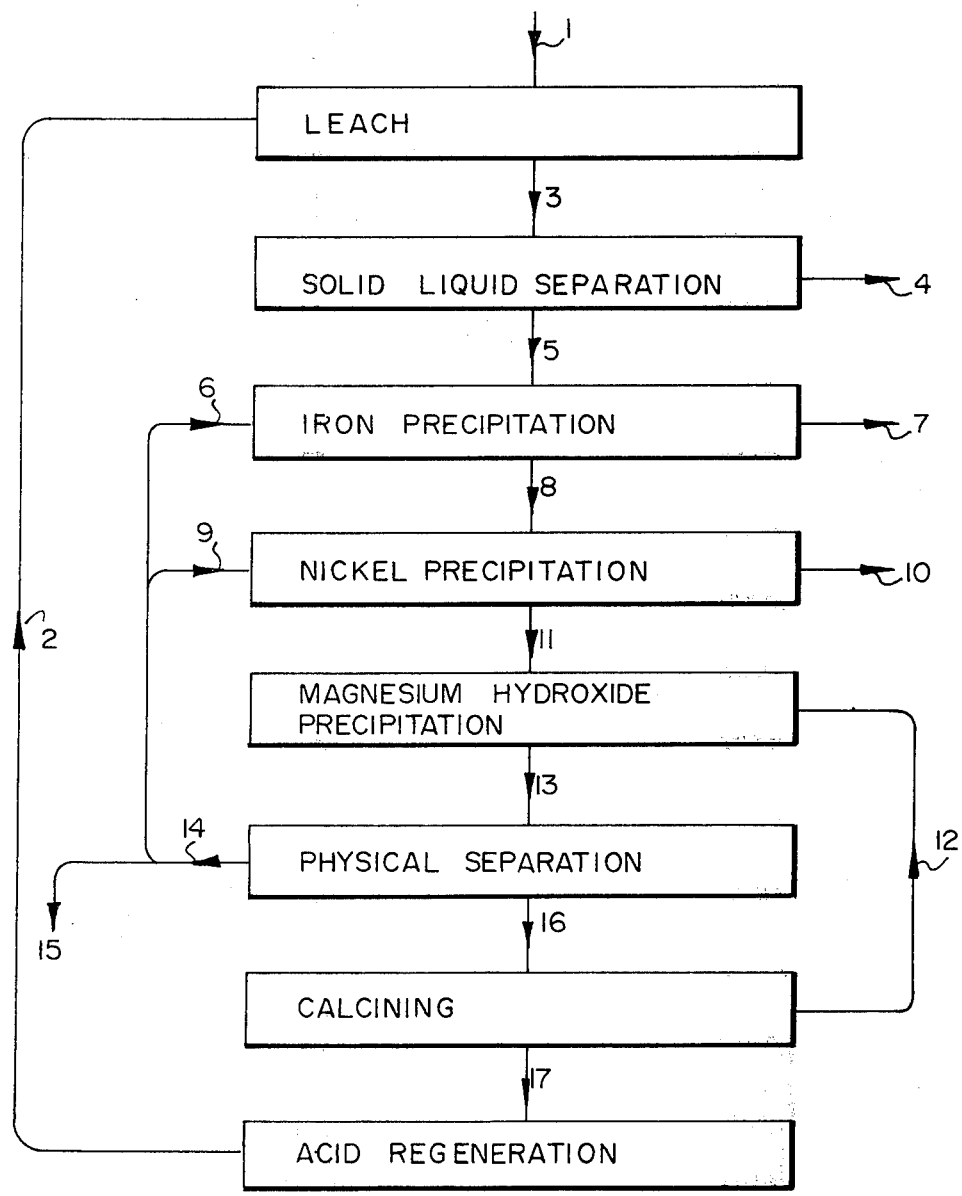

RECOVERING IRON, NICKEL, OR COBALT FROM SULFATE SOLUTION

The present invention relates to the recovery of iron, nickel or cobalt from sulfate solutions, and is particularly through not exclusively concerned with methods of processing lateritic ores or concentrates.

Lateritic ores which contain, for example, nickel which is to be recovered generally also contain substantial amounts of iron and magnesium. Hydrometallurgical processes for treating such ores therefore entail a large consumption of acids used for leaching and alkalis used for precipitation purposes; so that savings in the cost of either the former or the latter are of primary importance to the commercial viability of such processes.

A method of precipitating metals such as iron, nickel, cobalt and magnesium from sulfate solutions thereof using an inexpensive calcium base (i.e. lime or limestone) in described in co-pending application Ser. No. 616,927 of same date assigned in common with the present invention. In the process described and claimed in this co-pending application, the calcium base is added to the sulfate solution under controlled conditions which enable a hydroxide of the metal in question to be obtained which is of much smaller particle size than the precipitated gypsum and hence is readily separated therefrom. Where the sulfate solution contains several metals which are selectively precipitated in turn, it is of course necessary to separate each of the precipitated metal hydroxides from the gypsum precipitated therewith. Clearly, it is desirable to minimize the number of separation steps involved in such a process.

The present invention provides a method of recovering a metal value selected from the group consisting of iron, nickel and cobalt from a sulfate solution comprising the following steps:

I. treating the solution with magnesium hydroxide to precipitate the metal value as a hydroxide;

II. separating the precipitated hydroxide from the solution;

III. treating the solution separated in Step II with lime at a temperature $T°$ C which is at least 60° C for a period of $t$ minutes wherein:

$t \geq 15$, where $T \geq 90°$ C., and $t \geq 15 + (3/2)(90-T)$, where $60°$ C $\leq T \leq 90°$ C; while subjecting the solution to low energy agitation as herein defined, thereby forming a fine precipitate of magnesium hydroxide and a coarse precipitate of gypsum;

IV. separating the precipitates obtained in Step III into a fine fraction consisting mainly of magnesium hydroxide and a coarse fraction consisting mainly of gypsum; and V. recycling at least part of the magnesium hydroxide recovered in Step IV to perform Step I on fresh sulfate solution.

According to one aspect of the invention a method of processing a lateritic ore or concentrate containing magnesium and at least one metal value selected from the group iron, nickel and cobalt comprises the following steps:

I. Leaching the ore or concentrate with sulfuric acid to form a leach solution containing sulfates of magnesium and the metal value(s);

II. separating the leach solution from undissolved ore or concentrate;

III. stripping at least one metal value from the leach solution by adding magnesium hydroxide thereto the precipitate the hydroxide of the metal value(s);

IV. separating the precipitated hydroxide from the stripped solution;

V. treating the stripped solution with lime at a temperature $T°$ C which is at least 60° C for a period of $t$ minutes wherein;

$t \geq 15$, where $T \geq 90°$ C., and $t \geq 15 + (3/2)(90-T)$, where $60°$ C $\leq T \leq 90°$ C.; while subjecting the solution to low energy agitation as herein defined, thereby forming small particles of magnesium hydroxide and larger particles of gypsum;

VI. separating the precipitates obtained in Step V into a coarse fraction comprising mainly gypsum and a fine fraction comprising mainly magnesium hydroxide which can be recycled for performing the precipitation of Step III on fresh leach solution; and VII. heat treating the gypsum separated in Step VI to regenerate lime which can be recycled to perform the precipitation of Step V, and acid gas for regenerating sulfuric acid.

The term "low energy agitation" is used herein to denote agitation which is effective to ensure intimate contact and reaction between magnesium-containing solution and added lime, but which does not impart a higher shear which would cause nucleation at a large number of sites and fragmentation of the growing gypsum crystals and thus prevent attainment of the desired large gypsum particle size. The energy of agitation depends of course on the method employed for the agitation. Thus where mechanical agitation is used, the energy is a fraction of the design, position and speed of rotation of the blades as well as the design and position of any baffles present in the precipitation vessel. In general, the agitation used should be such as to impart to the slurry an energy which does not exceed 3 (and is preferably much lower, e.g. of the order of 0.2 kilowatts per cubic meter of slurry. Air agitation is a convenient way of achieving good mixing without imparting high shear, and moreover because of its low power consumption constitutes a preferred feature of the process of the present invention.

In carrying out the step of magnesium hydroxide precipitation, it is essential to adhere to all the criteria or reaction temperature, reaction duration (i.e. residence) and degree of agitation in order to achieve the desired easily separated mixed precipitate. Thus whereas neutralization can be accomplished in 15 minutes or more at 90° C, a holding time of at least 1 hour is required at 60° C.

The lime used to precipitate the magnesium hydroxide can be added as such into the precipitation vessel, e.g., as a −325 mesh, Tyler Screen Size (TSS) powder. Preferably however the lime is introduced in the form of a slurry.

The magnesium hydroxide precipitation is preferably carried out in a continuous manner, i.e. appropriate amounts of the sulfate solution and lime slurry are fed into a precipitation vessel, and the resulting slurry is extracted from the vessel at such a rate as to maintain a fixed volume within the vessel. The relative proportions of solution and lime slurry are controlled by measurement of the pH within the precipitation vessel, which pH is preferably maintained at a value between 9 and 10.

The formation of large crystals of gypsum is aided by the presence in the solution of gypsum seed crystals. While the initial introduction of such seeds is not essential in that the crystallization can proceed on the self-nucleating basis, it has been found advantageous to introduce gypsum seeds initially. Of course when the precipitation is carried out as a continuous process, seeds will be present in solution under steady state conditions.

Processing of a lateritic ore by the method of the present invention leads to recovery of valuable metals in the ore as hydroxides which are not significantly contaminated with precipitated gypsum. The valuable metals can be recovered individually, in known manner, by suitably controlling the magnesium hydroxide addition so as to raise the pH of the solution to the value appropriate for selective precipitation of one of the metals.

The regeneration of the magnesium hydroxide with the air of the less expensive lime minimizes the need for replenishing magnesium hydroxide. Indeed where the process of the invention is practised on material of high magnesium content, the amount of magnesium hydroxide formed by lime neutralization can be far in excess of that required for recycling to precipitate the valuable metals. Such excess of magnesium hydroxide is free from valuable metals and can be converted to a marketable by-product.

By calcining the gypsum produced in the process reagents costs are minimized in view of the regeneration of both the alkali (lime) used in the process and acid gases (oxides of sulfur) from which leach acid is regenerated. Thus the overall process provides a convenient and economical hydrometallurgical method of treating such magnesium containing ores.

BRIEF DESCRIPTION OF THE DRAWING

In order to aid in understanding the invention, a preferred embodiment will now be described with reference to the accompanying drawing, which represents a flow-sheet of a process for treating a lateritic ore.

DETAILED DESCRIPTION OF THE DRAWING

The lateritic ore, 1, treated in the process shown in the drawing is a typical hydrated nickel-iron magnesium silicate ore containing about 3% nickel, 13% iron and 24% magnesia. The ore is leached with sulfuric acid, 2, at a temperature of about 150° C under its natural pressure to dissolve the iron, nickel and magnesium as sulfates. The slurry, 3, resulting from the leach is subjected to counter-current decantation to effect separation of the solid residue, 4, which consists essentially of silica, from the leach solution, 5.

The leach solution, 5, is then aerated and treated with a magnesium hydroxide slurry, 6, so as to raise the pH to about 4, thereby precipitating the iron from the solution as ferric hydroxide 7, which is separated from the solution by filtration. After removal of the iron, the solution, 8, is further neutralized by adding a magnesium hydroxide slurry, 9, to raise the pH thereof to 8.0, thereby precipitating the nickel as a hydroxide, 10, which is separated by filtration from the solution, 11, which contains essentially only magnesium sulfate.

The magnesium containing solution, 11, is now treated with a lime slurry, 12, to precipitate magnesium hydroxide. This precipitation stage is carried out by adding sufficient lime slurry to raise the solution pH to 9.5, while maintaining the solution at 80° C and slowly stirring (the agitation being such that it imparts about 0.2 kW/m$^3$ of energy to the solution) for 1 hour. By neutralizing in this manner a slurry, 13, is obtained in which the solids consist of magnesium hydroxide of small particles size and gypsum of large particle size.

The slurry, 13, is now subjected to wet screening on a 325 (TSS) screen whereby a fine fraction is obtained which contains about 97% by weight of the magnesium present in the solids, and only 9% by weight of the calcium in the solids. This fine fraction, 14, is recycled in part to provide the slurries 6 and 9, used for precipitation of the iron and nickel, respectively. The remainder of the slurry 14 is bled off to provide a marketable by-product, 15.

The +325 mesh fraction, 16, from the screening process contains over 90% by weight of the gypsum present in the screened solids and only 3% by weight of the magnesium in the solids. This fraction is fed into a calcining furnace and heated to about 1200° C under mildly reducing conditions to convert the gypsum to calcium oxide which is then slaked and recycled as the slurry, 12, to the magnesium hydroxide precipitation stage. The off-gases, 17, generated during the calcining operation are scrubbed with water and catalytically converted to sulfuric acid, 2, for leaching fresh ore.

Although the invention has been particularly described with reference to preferred embodiments, it will be understood that various modifications can be made to the conditions specified in these embodiments without departing from the scope of the invention, which is defined by the appended claims.

What is claimed is:

1. A method of recovering a metal value selected from the group consisting of, nickel and cobalt from a sulfate solution comprising the following steps:
    I. treating the solution with magnesium hydroxide to precipitate the metal value as a hydroxide;
    II. separating the precipitated hydroxide from the solution;
    III. treating the solution separated in step II with lime at a temperature T° C which is at least 60° C for a period of $t$ minutes wherein:

$t \geq 15$, where $T \geq 90°$ C., and $t \geq 15 + (3/2)(90-T)$, where $60° C \leq T \leq 90° C$; while subjecting the solution to lower energy agitation thereby forming a fine precipitate of magnesium hydroxide and a coarse precipitate of gypsum;
    IV. separating the precipitates obtained in step III into a fine fraction consisting mainly a magnesium hydroxide and a coarse fraction consisting mainly of gypsum; and
    V. recycling at least part of the magnesium hydroxide recovered in step IV to perform step I on fresh sulfate solution.

2. A method of processing a lateritic ore or concentrate containing magnesium and at least one metal value selection from the group iron, nickel and cobalt comprising the following steps:
    I. leaching the ore or concentrate with sulfuric acid to form a leach solution containing sulfates of magnesium and the metal value(s);
    II. separating the leach solution from undissolved ore or concentrate; III. aerating the leach solution to ensure that any dissolved iron is present in the ferric state, IV. stripping at least one metal value from the each solution by adding magnesium hydroxide thereto to precipitate the hydroxide of the metal value;

V. separating the precipitated hydroxide from the stripped solution;

VI. treatment the stripped solution with lime at a temperature T° C which is at least 60° C for a period of $t$ minutes wherein:

$t \geq 15$, where $T \geq 90°$ C., and $t \geq 15 + (3/2)(90-T)$, where $60° C \leq T \leq 90°$ C.; while subjecting the solution to low energy agitation, thereby forming small particles of magnesium hydroxide and larger particles of gypsum;

VII. separating the precipitates obtained in step VI into a coarse fraction comprising mainly gypsum and a fine fraction comprising mainly magnesium hydroxide which can be recycled for performing the precipitation of step IV on fresh leach solution; and VIII. heat treating the calcium sulfate separated in step VIII to regenerate lime which can be recycled to perform the precipitation of step VI, and acid gas for regenerating sulfuric acid.

3. A method in accordance with claim 2 wherein said steps IV and V are cyclically repeated to recover a plurality of metal values separately.

4. A method in accordance with claim 2 wherein said step VII comprises screening the solids precipitated in said step VI.

5. A method in accordance with claim 2 wherein said step VII comprises elutriating the solids precipitated in said step VI.

6. A method in accordance with claim 2 wherein said low energy agitation in said step VI comprises air agitation.

* * * * *

UNITED STATES PATENT OFFICE
CERTIFICATE OF CORRECTION

Patent No. 4,006,215  Dated May 10, 1977

Inventor(s) Rotrou Alan Hall et al.

It is certified that error appears in the above-identified patent and that said Letters Patent are hereby corrected as shown below:

Column 1, line 7, "through" should read -- though --; line 21, "in", first occurrence, should read -- is --.

Column 2, line 4, "the" should read -- to --; line 10, "wherein;" should read -- wherein: --; line 29, after "between" insert -- the --; line 31, "higher" should read -- high --; line 37, "fraction" should read -- function --; line 50, "or" should read -- of --.

Column 3, line 18, "the", third occurrence, should read -- a --; line 22, "air" should read -- aid --; line 59, "hydroxide" should read -- hydroxide, --.

Column 4, line 7, "particles" should read -- particle --; line 9, after "325" insert -- mesh --; line 36, line 2 of claim 1, after "of" delete -- , --; line 49, line 13 of claim 1, "lower" should read -- low --; line 50, line 14 of claim 1, after "agitation" insert -- , --; line 54, line 18 of claim 1, after "mainly" delete "a" and insert -- of --.

UNITED STATES PATENT OFFICE
CERTIFICATE OF CORRECTION

Patent No. 4,006,215    Dated May 10, 1977

Inventor(s) Rotrou Alan Hall et al.

It is certified that error appears in the above-identified patent and that said Letters Patent are hereby corrected as shown below:

Column 5, line 2, line 11 of claim 2, "state," should read -- state; --; line 3, line 12 of claim 2, "each" should read -- leach --; line 8, line 17 of claim 2, "treatment" should read -- treating --.

Column 6, line 5, line 32 of claim 2, "VIII" should read -- VII --.

Signed and Sealed this

First Day of November 1977

[SEAL]

Attest:

RUTH C. MASON
*Attesting Officer*

LUTRELLE F. PARKER
*Acting Commissioner of Patents and Trademarks*